US011166077B2

(12) United States Patent
Dalbec et al.

(10) Patent No.: US 11,166,077 B2
(45) Date of Patent: Nov. 2, 2021

(54) SYSTEMS AND METHODS FOR DISPLAYING SUBJECTS OF A VIDEO PORTION OF CONTENT

(71) Applicant: Rovi Guides, Inc., San Jose, CA (US)

(72) Inventors: Gabriel C. Dalbec, Morgan Hill, CA (US); Nicholas Lovell, Santa Clara, CA (US); Lance G. O'Connor, Sunnyvale, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 16/226,916

(22) Filed: Dec. 20, 2018

(65) Prior Publication Data
US 2020/0204867 A1 Jun. 25, 2020

(51) Int. Cl.
| | |
|---|---|
| *H04N 21/472* | (2011.01) |
| *H04N 21/845* | (2011.01) |
| *H04N 21/431* | (2011.01) |
| *G06K 9/00* | (2006.01) |
| *G06T 7/246* | (2017.01) |

(52) U.S. Cl.
CPC ... *H04N 21/47217* (2013.01); *G06K 9/00241* (2013.01); *G06K 9/00711* (2013.01); *G06T 7/246* (2017.01); *H04N 21/4316* (2013.01); *H04N 21/8456* (2013.01)

(58) Field of Classification Search
CPC ......... H04N 21/47217; H04N 21/8456; H04N 21/4316; H04N 21/23418; H04N 21/44008; H04N 21/4394; H04N 19/513; H04N 5/144; H04N 19/139; H04N 5/145; H04N 5/23219; G06K 9/00241; G06K 9/00711; G06K 9/00744; G06K 9/00221; G06K 9/00335; G06T 7/246; G06T 7/20; G06T 7/215
USPC .......................................................... 725/32
See application file for complete search history.

(56) References Cited

U.S. PATENT DOCUMENTS

| | | |
|---|---|---|
| 6,567,775 B1 | 5/2003 | Maali et al. |
| 6,748,356 B1 | 6/2004 | Beigi et al. |
| 6,922,478 B1 * | 7/2005 | Konen ............... G06K 9/00221 |
| | | 382/115 |

(Continued)

OTHER PUBLICATIONS

H. Shih, "A Survey of Content-Aware Video Analysis for Sports," in IEEE Transactions on Circuits and Systems for Video Technology, vol. 28, No. 5, pp. 1212-1231, May 2018, doi: 10.1109/TCSVT.2017.2655624. (Year: 2018).*

(Continued)

*Primary Examiner* — Cynthia M Fogg
(74) *Attorney, Agent, or Firm* — Haley Guiliano LLP

(57) ABSTRACT

Systems and methods are described herein for displaying subjects of a portion of content. Media data of content is analyzed during playback, and a number of action signatures are identified. Each action signature is associated with a particular subject within the content. The action signature is stored, along with a timestamp corresponding to a playback position at which the action signature begins, in association with an identifier of the particular subject. Upon receiving a command, icons representing each of a number of action signatures at or near the current playback position are displayed. Upon receiving user selection of an icon corresponding to a particular signature, a portion of the content corresponding to the action signature is played back.

38 Claims, 13 Drawing Sheets

(56) References Cited

U.S. PATENT DOCUMENTS

| | | | |
|---|---|---|---|
| 9,258,604 B1 | 2/2016 | Bilobrov et al. | |
| 9,454,993 B1* | 9/2016 | Lawson | G11B 27/102 |
| 9,558,749 B1 | 1/2017 | Seeker-Walker et al. | |
| 9,578,377 B1* | 2/2017 | Malik | G11B 27/34 |
| 2003/0149881 A1 | 8/2003 | Patel et al. | |
| 2005/0254685 A1* | 11/2005 | Miyamori | G06K 9/00711 |
| | | | 382/103 |
| 2007/0279494 A1* | 12/2007 | Aman | H04N 5/262 |
| | | | 348/169 |
| 2008/0235724 A1* | 9/2008 | Sassenscheidt | G06F 16/784 |
| | | | 725/32 |
| 2009/0122198 A1 | 5/2009 | Thorn | |
| 2009/0278937 A1* | 11/2009 | Botchen | G06K 9/00771 |
| | | | 348/169 |
| 2010/0115542 A1 | 5/2010 | Lee | |
| 2011/0022589 A1 | 1/2011 | Bauer et al. | |
| 2011/0211802 A1* | 9/2011 | Kamada | G11B 27/034 |
| | | | 386/201 |
| 2012/0203757 A1 | 8/2012 | Ravindran | |
| 2013/0011121 A1 | 1/2013 | Forsyth et al. | |
| 2013/0152139 A1 | 6/2013 | Davis et al. | |
| 2013/0160038 A1 | 6/2013 | Slaney et al. | |
| 2014/0245339 A1 | 8/2014 | Zhang et al. | |
| 2015/0356332 A1* | 12/2015 | Turner | G01S 5/0226 |
| | | | 340/10.5 |
| 2016/0275588 A1 | 9/2016 | Ye et al. | |
| 2016/0295273 A1 | 10/2016 | Ehlers et al. | |
| 2016/0337701 A1 | 11/2016 | Khare et al. | |
| 2017/0041684 A1 | 2/2017 | Krishnamurthy | |
| 2017/0264970 A1 | 9/2017 | Mitra et al. | |
| 2017/0339446 A1* | 11/2017 | Arms | H04N 21/231 |
| 2017/0352380 A1* | 12/2017 | Doumbouya | H04N 7/181 |
| 2018/0220195 A1 | 8/2018 | Panchaksharaiah et al. | |
| 2019/0013047 A1* | 1/2019 | Wait | G11B 27/031 |
| 2019/0180149 A1* | 6/2019 | Knittel | G06N 3/08 |

OTHER PUBLICATIONS

S. C. W. Tim, M. Rombaut and D. Pellerin, "Rejection-based classification for action recognition using a spatio-temporal dictionary," 2015 23rd European Signal Processing Conference (EUSIPCO), Nice, France, 2015, pp. 1133-1137, doi: 10.1109/EUSIPCO.2015.7362560. (Year: 2015).*

A. Tejero-de-Pablos, Y. Nakashima, T. Sato, N. Yokoya, M. Linna and E. Rahtu, "Summarization of User-Generated Sports Video by Using Deep Action Recognition Features," in IEEE Transactions on Multimedia, vol. 20, No. 8, pp. 2000-2011, Aug. 2018, doi: 10.1109/TMM.2018.2794265. (Year: 2018).*

U.S. Appl. No. 16/226,886, filed Dec. 20, 2018, Gabriel C. Dalbec.

Friedland et al., "Using artistic markers and speaker identification for narrative-theme navigation of Seinfeld episodes," 2009 11th IEEE International symposium on Multimedia, IEEE Computer Society 511-516.

Miro et al., "Speaker diarization: A review of recent research," IEEE Transactions on Audio Speech, and Language Processing, 20: (2) 356-370 (2012).

Partial International Search Report of PCT/US2019/067498 dated Apr. 28, 2020.

International Search Report and Written Opinion of PCT/US2019/067498 dated Jul. 3, 2020.

* cited by examiner

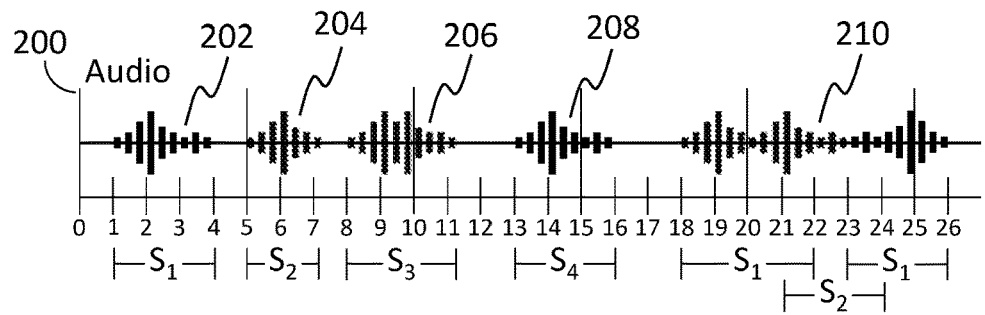

FIG. 2

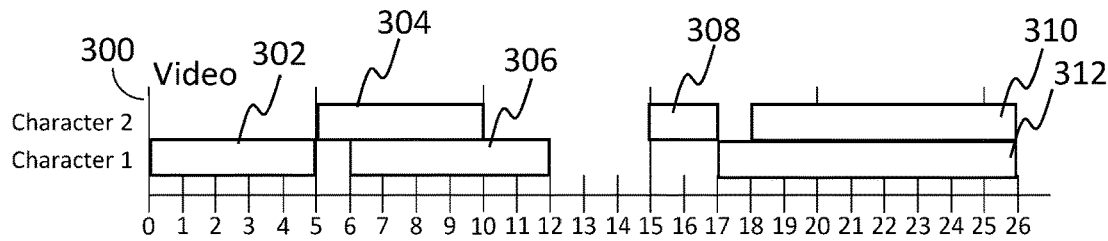

FIG. 3

| Time | Signatures/Characters Present | Assignments |
|---|---|---|
| $T_0 - T_1$ | $C_1$ | |
| $T_1 - T_4$ | $S_1$ and $C_1$ | $S_1$ to $C_1$ |
| $T_4 - T_5$ | $C_1$ | |
| $T_5 - T_6$ | $S_2$ and $C_2$ | $S_2$ to $C_2$ |
| $T_6 - T_7$ | $S_2$ and $C_2$ and $C_1$ | |
| $T_7 - T_8$ | $C_1$ and $C_2$ | |
| $T_8 - T_{10}$ | $S_3$ and $C_1$ and $C_2$ | $S_3$ to UNKNOWN-1 |
| $T_{10} - T_{11}$ | $S_3$ and $C_1$ | |
| $T_{11} - T_{12}$ | $C_1$ | |
| $T_{12} - T_{13}$ | NONE | |
| $T_{13} - T_{15}$ | $S_4$ | $S_4$ to UNKNOWN-2 |
| $T_{15} - T_{16}$ | $S_4$ and $C_2$ | |
| $T_{16} - T_{17}$ | $C_2$ | |
| $T_{17} - T_{18}$ | $C_1$ | |
| $T_{18} - T_{21}$ | $S_1$ and $C_1$ and $C_2$ | $S_1$ to $C_1$ |
| $T_{21} - T_{22}$ | $S_1$ and $S_2$ and $C_1$ and $C_2$ | $S_2$ to $C_2$ |
| $T_{22} - T_{23}$ | $S_2$ and $C_1$ and $C_2$ | |
| $T_{23} - T_{24}$ | $S_2$ and $S_1$ and $C_1$ and $C_2$ | $S_1$ to $C_1$ |
| $T_{24} - T_{26}$ | $S_1$ and $C_1$ and $C_2$ | |

FIG. 4

| Time | Signatures/Characters Present | Assignments |
|---|---|---|
| $T_0 - T_3$ | $C_1$ | |
| $T_3 - T_5$ | $C_1$ and $A_1$ | $A_1$ to $C_1$ |
| $T_5 - T_6$ | $C_2$ and $A_1$ | |
| $T_6 - T_8$ | $C_1$ and $C_2$ and $A_1$ | |
| $T_8 - T_{10}$ | $C_1$ and $C_2$ | |
| $T_{10} - T_{12}$ | $C_1$ | |
| $T_{12} - T_{15}$ | NONE | |
| $T_{15} - T_{17}$ | $C_2$ | |
| $T_{17} - T_{18}$ | $C_1$ | |
| $T_{18} - T_{19}$ | $C_1$ and $C_2$ | |
| $T_{19} - T_{23}$ | $C_1$ and $C_2$ and $A_2$ | $A_2$ to $C_2$ |
| $T_{23} - T_{26}$ | $C_1$ and $C_2$ | |

SYSTEMS AND METHODS FOR DISPLAYING SUBJECTS OF A VIDEO PORTION OF CONTENT

BACKGROUND

The present disclosure relates to content delivery and consumption systems and, more particularly, repeating portions of content associated with a particular subject in the content.

SUMMARY

In conventional media consumption systems, when a user wishes to repeat a portion of content (e.g., because the user did not understand the dialogue, or the user missed an action sequence), the user must rewind the content to a playback position prior to the portion they wish to repeat. However, rewind mechanisms are imprecise and do not allow the user to easily control the playback position to which the content returns. This results in the user either not rewinding far enough and missing some of the content the user wishes to repeat, or rewinding farther than the playback position at which the desired portion begins and having to unnecessarily re-watch additional portions of the content.

Furthermore, professionally generated content often contains closed captioning data, which allows a system to repeat a specific portion of audio associated with the subject or character who spoke the dialog. In the case of user generated content (for example millions of hours of video uploaded to websites for playback each day) there is no embedded closed caption data with which a system could use for this purpose.

Systems and methods are described herein for repeating portions of content associated with a particular subject (e.g., character or object) in the content. While the content is playing on a device, content data is analyzed, and a number of signatures are identified. In some embodiments, audio data is analyzed to identify audio signatures (voice or song recognition is an example where audio signatures can be used as identifiers), and each audio signature is associated, based on audio and/or video characteristics, with a particular subject within the content. In some embodiments, video data is analyzed to identify action signatures based on the motion of subjects displayed in the content. An identifier of each action signature is stored, along with a timestamp corresponding to a playback position at which the action signature begins. Subjects may also be identified during playback, and subject signatures identified or assigned to each subject. An identifier of each subject signature is stored, along with a timestamp corresponding to a playback position at which the subject is displayed in the content. A subject signature may be assigned to an audio signature or action signature having the same timestamp.

Upon receiving a command, playback of the content is paused and icons representing each of a number of signatures are displayed. The number of icons could be determined by the number of signatures at or near the current playback position or all icons representing the entirety of signatures identified up to the playback position could be displayed. Upon receiving user selection of an icon corresponding to a particular signature, a portion of the content corresponding to the signature is played back.

In some embodiments, upon receiving user selection of an icon corresponding to a particular subject, an identifier of the subject is retrieved. The timestamp of a signature associated with the identifier is then retrieved, and a portion of the content is played back beginning at the timestamp.

The icons may include an image of the subject corresponding to their respective signature. Video data corresponding to the signature is processed, and a subject of the signature is identified. A portion of a frame of video data in which the subject is displayed is captured as an image for display in the icon.

To identify an audio signature, audio data is analyzed beginning at a first playback position. Audio characteristics unique to a first subject are identified. As analysis continues, audio characteristics of the current audio data are compared with those of previous data. If a significant change in audio characteristics is detected, the portion of audio data from the first playback position to the current playback position is identified as an audio signature. Video data may also be analyzed to determine whether a particular subject responsible for the audio is displayed in the content.

More than one audio signature may have an ending playback position within a threshold amount of time of the current playback position. To determine which portion of audio data to repeat, it is determined whether any of the audio signatures overlap one another. If not, the portion of audio data corresponding to the most recent audio signature is played back. If an audio signature does overlap with another, audio data corresponding to each audio signature is isolated. Icons corresponding to the subject of each signature are then displayed, and the portion corresponding to a selected icon is played back.

To identify an action signature, video data is analyzed beginning at a first playback position. Motion displayed in the content is tracked, and a subject of motion is identified. For example, a face may be detected in a frame of the video content. As analysis continues, the level of motion (e.g., the speed at which the subject moves) is detected. When the level of motion is detected as above a threshold level, the portion of content from the first playback position to the current playback position is identified as an action signature.

If a user selects a particular icon more than once, the system identifies a number of signatures corresponding to the subject represented by the selected icon. The number of selections is counted, and the system retrieves the signature that is the number of selections prior to the current playback position and repeats the portion of content identifier by the retrieved signature. For example, if the user double taps an icon the system will playback the second most recent content associated with that subject (e.g., what the subject said prior to the last comment).

If an action signature has a length below a minimum threshold, the portion of content corresponding to the signature is repeated in slow motion. If the action signature has a length between the minimum threshold and a maximum threshold, the portion of content is played in a continuous loop until another input command is received, for a predetermined number of loops, or for a predetermined period of time.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows a generalized embodiment of audio data to be processed in accordance with some embodiments of the disclosure;

FIG. 3 shows a generalized embodiment of video data to be processed in accordance with some embodiments of the disclosure;

FIG. 4 shows an example of a table generated by processing audio and video data together and assignment of subject signatures to audio signatures in accordance with some embodiments of the disclosure;

DETAILED DESCRIPTION

Figure 1:
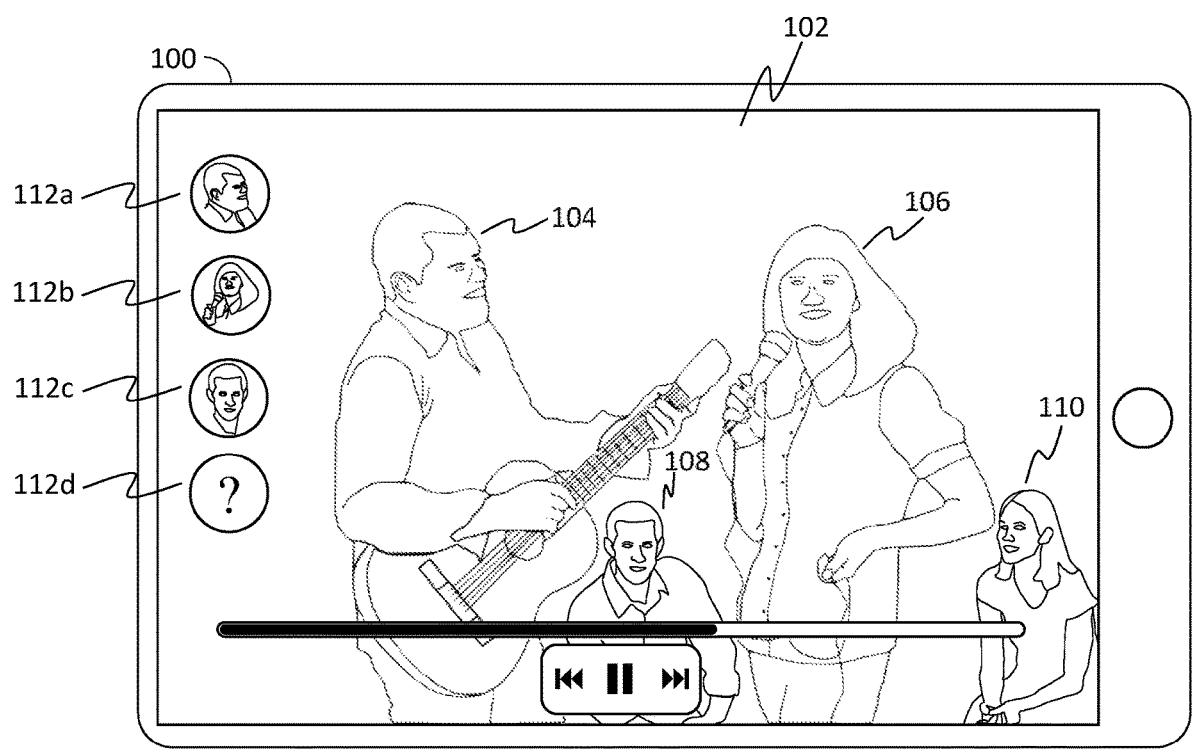
FIG. 1 shows a generalized embodiment of a user interface displayed in response to a command to repeat audio in accordance with some embodiments of the disclosure.

FIG. 1 depicts a user interface displayed over content 102 in response to a command to pause or repeat a portion of media content. While content 102 is being consumed on media device 100, the media device 100 processes audio and/or video data of the content 102 to identify a number of signatures (e.g., audio signatures or action signatures, as discussed below). A user may tap on a touchscreen interface of the media device 100 to pause the content 102. A user may alternatively or additionally request that a portion of content be repeated, using, for example, a voice command or user input device. Upon receiving the command, the media device 100 pauses playback of the content 102 and displays a series of icons 112a-112d representing subjects 104, 106, 108, and 110 of signatures at or near the paused playback position. The user may select one of the icons 112a-112d and, in response, the media device 100 repeats the portion of content corresponding to a recent signature associated with the subject represented by the selected icon. For example, icon 112a represents subject 104. In response to selection of icon 112a, media device 100 repeats a portion of dialogue identified by media device 100 as having been spoken by the character identified as subject 104.

FIG. 2 depicts an embodiment of audio processing to identify audio signatures in content 102. Media device 100 processes audio data 200 during playback of content 102. Media device 100 identifies audio characteristics of audio data 202 and determines that audio data 202 is spoken or otherwise generated by a single subject in content 102. As playback of content 102 continues, media device 100 processes audio data 204 and determines, based on a comparison of audio characteristics of audio data 204 with those of audio data 202, that audio data 204 is spoken or otherwise generated by a different subject than that of audio data 202. The media device 100 may generate a database or other data structure in which to store each audio signature along with an identifier of the associated subject. Media device 100 continues processing audio data 206 and 208 in a similar manner. In some cases, multiple subjects may generate audio at the same time. For example, audio data 210 may include audio generated by two separate subjects simultaneously. Media device 100 processes the audio data and isolates audio data from each subject using audio characteristics specific to each subject, such as base frequency, modulation, amplitude, or other audio characteristics.

FIG. 3 depicts an embodiment of video processing to identify subject signatures in content 102. Media device 100 processes video data 300 in conjunction to identify subjects in video of content 102. Media device 100 processes video data 300 to identify discrete objects and characters/actors in content 102. Media device 100 determines at least one object or character/actor present in at least one frame of video. Media device 100 may use facial recognition, object recognition, edge detection, or any other suitable video processing methods to identify objects and characters/actors. Media device 100 determines that Character 1 is displayed in video data portions 302, 306, and 312 and Character 2 is displayed in video data portions 304, 308, and 310. Media device 100 may store parameters corresponding to each identified character as a subject signature.

FIG. 4 shows an example of a table generated by processing audio and video data together and assignment of subject signatures to audio signatures in accordance with some embodiments of the disclosure. Media device 100 determines at what timestamps a source signature and audio signature overlap and assigns the respective subject to the overlapping audio signature. Between $T_0$ and $T_1$, Character 1 is displayed in content 102. From $T_1$ through $T_4$, Character 1 continues to be displayed while audio signature $S_1$ is present in the content 102. Media device 100 assigns $S_1$ to Character 1. From $T_4$ to $T_5$ Character 1 continues to be displayed, but no audio signature is present. From $T_5$ to $T_6$ Character 2 is displayed in content 102 while audio signature $S_2$ is present. Media device 100 assigns $S_2$ to Character 2. Beginning at $T_7$, both Character 1 and Character 2 are displayed in content 102. Audio signature $S_3$ begins at $T_8$. Media device 100 determines that the audio characteristics of audio signature $S_3$ do not match the audio characteristics of any previously identified audio signature (i.e., $S_1$ or $S_2$) and temporarily assigns audio signature $S_3$ to "UNKNOWN-1." Similarly, at $T_{13}$ audio signature $S_4$ is present in content 102 and media device 100 determines that the audio characteristics of audio signature $S_4$ do not match the audio characteristics of any previously identified audio signature (i.e., $S_1$, $S_2$, or $S_3$). Additionally, no character is displayed at $T_{13}$. Therefore, media device 100 temporarily assigns audio signature $S_4$ to "UNKNOWN-2." At $T_{18}$, an audio signature begins while Character 1 is displayed in the content 102. The audio characteristics of the audio signature match those of audio signature $S_1$ which was previously identified and assigned to Character 1. Media device 100 therefore identifies the audio signature as $S_1$ and assigns it to Character 1. At $T_{18}$, Character 2 is also displayed in the content 102 and at $T_{21}$, while audio signature $S_1$ is still present in the content 102, another audio signature begins, having audio characteristics matching those of audio signature $S_2$. Because $S_2$ was previously identified as assigned to Character 2, and because $S_1$ is still present and is already assigned to Character 1, media device 100 assigns $S_2$ to Character 2. Using a similar analysis at $T_{23}$, media device 100 identifies the audio signature as $S_1$ based on its audio characteristics and assigns it to Character 1.

Figures 5, 6:
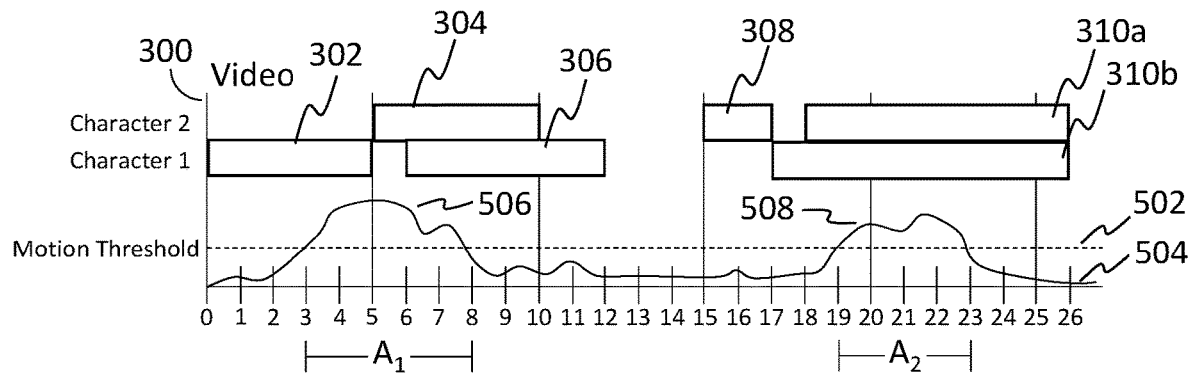
FIG. 5 show another generalized embodiment of video data to be processed in accordance with some embodiments of the disclosure.
FIG. 6 shows an example of a table generated by processing video data and assignment of subject signatures to action signatures in accordance with some embodiments of the disclosure.

FIG. 5 depicts an embodiment of video processing to identify action signatures in content 102. Media device 100 processes video data 300 to determine if the motion of any subject displayed in the video exceeds a threshold level of motion 502. Media device 100 first identifies motion 504 of subjects in video of content 102. Media device 100 identifies discrete objects and characters/actors in content 102. Media device 100 determines at least one object or character/actor present in at least one frame of video. Media device 100 may use facial recognition, object recognition, edge detection, or any other suitable video processing methods to identify objects and characters/actors. Media device 100 compares the position of each subject in a subsequent frame of video to determine if any subject moved more than a threshold distance between the two frames of video. For example, media device 100 determines that motion of Character 1 exceeds threshold 502 from $T_3$ through $T_8$ and identifies motion 506 as action signature $A_1$. Similarly, media device 100 determines the motion of Character 2 exceeds the threshold 502 from $T_{19}$ through $T_{23}$ and identifies motion 508 as action signature $A_2$.

FIG. 6 shows an example of a table generated by processing video data and assignment of subject signatures to action signatures in accordance with some embodiments of the disclosure. Similar to the analyses described above in connections with FIG. 4, media device 100 assigns action signatures to subject signatures based on which subject signatures coincide with which action signatures. Thus, action signature $A_1$ is assigned to Character 1 at $T_3$ due to Character 1 being present at the start of $A_1$, and action signature $A_2$ is assigned to Character 2 at $T_{19}$ due to Character 2 being present at the start of $A_2$.

Figure 7:
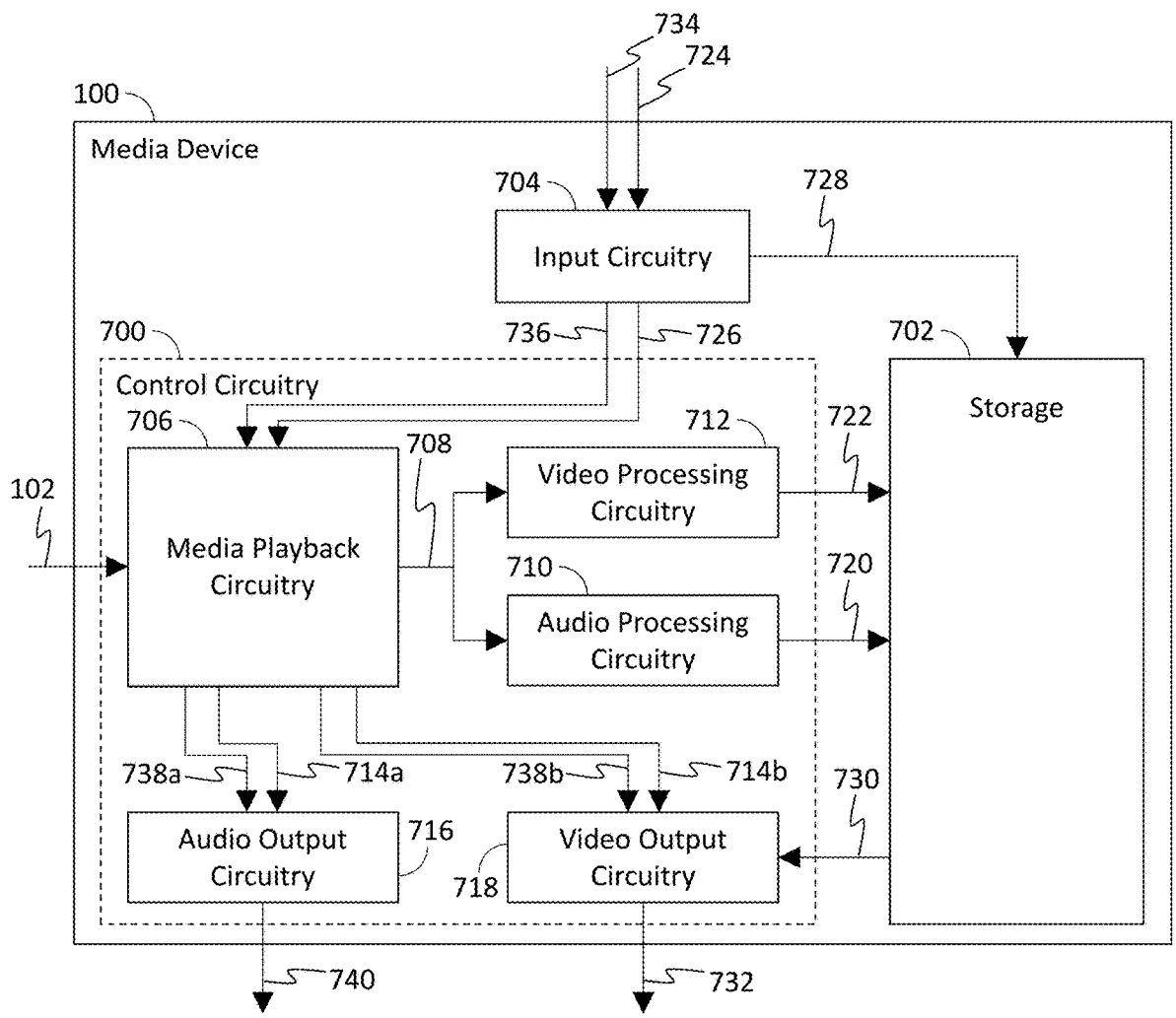
FIG. 7 is a block diagram representing control circuitry and data flow within a media device in response to a command to repeat audio in accordance with some embodiments of the disclosure.

FIG. 7 is an illustrative block diagram representing circuitry and data flow within media device 100 in accordance with some embodiments of the disclosure. Media device 100 may be any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same. Media device 100 comprises input circuitry 704. Input circuitry 704 may include a microphone and voice processing circuitry for receiving voice commands, infrared receiving circuitry for receiving commands from a remote control device, a touchscreen interface for receiving user interaction with graphical user interface elements, or any combination thereof or any other suitable input circuitry for receiving any other suitable user input. Media device 100 also comprises control circuitry 700 and storage 702. Control circuitry 700 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Input circuitry 704 may be integrated with control circuitry 700. Storage 702 may be any device for storing electronic data, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same.

Control circuitry 700 comprises media playback circuitry 706. Media playback circuitry 706 receives content 102 from a content provider. The content provider may be an OTT/Internet service (e.g., Netflix), a traditional television network (e.g., NBC), a traditional media company (e.g., NBCUniversal), or any other suitable content provider. Content 102 may be received via a physical RF channel over a cable television connection or terrestrial broadcast, or may be received over an Internet connection from an over-the-top (OTT) service using a wired connection (e.g., Ethernet) or wireless connection (e.g., 802.11a/b/g/n (WiFi), WiMax, GSM, UTMS, CDMA, TDMA, 3G, 4G, 4G LTE, or any other suitable type of wireless data transmission). Media playback circuitry processes content 102 and transmits 708 audio and video data of content 102 to audio processing circuitry 710 and video processing circuitry 712, respectively. Media playback circuitry transmits 714a the audio data of content 102 to audio output circuitry 716 and simultaneously transmits 714b the video data of content 102 to audio output circuitry 716 and video output circuitry 718, respectively.

Audio processing circuitry 710 analyzes audio characteristics of audio data of content 102 to identify unique audio signatures using any suitable audio analysis technique. For example, audio processing circuitry 710 may use frequency analysis to determine a base frequency and unique harmonic pattern of a particular voice, phoneme analysis to determine an accent of a particular voice, etc. Audio processing circuitry 710 may also identify non-vocal audio such as music, sound effects, and the like using similar frequency analysis techniques or any other suitable method of audio analysis. Once a particular set of audio characteristics have been identified, audio processing circuitry 710 stores the audio characteristics in, for example, storage 702, along with a timestamp corresponding to a playback position of content 102 at which the audio characteristics were first identified. Audio processing circuitry 710 continues to analyze audio data of content 102 and compares the determined audio characteristics of the audio data to the stored audio characteristics. Upon detecting a significant difference in audio characteristics, audio processing circuitry 710 determines that the source of the audio has changed. For example, the base frequency of a voice may change by more than 20 Hz. Audio processing circuitry generates an audio signature from the stored audio characteristics and timestamp and stores 720 the audio signature in a database in storage 702. Audio processing circuitry 710 then stores the new audio characteristics and a new timestamp in storage 702 and continues analyzing the audio data as described above.

In some embodiments, media device 100 processes video data of content 102 in conjunction with the audio data to identify a subject corresponding to an audio signature. In some embodiments, media device 100 processes video data to identify action signatures based on motion of subjects in content 102. Video processing circuitry 712 analyzes video data of content 102 using edge detection, facial recognition, or any other suitable video or image processing technique to identify subjects in a video frame. Video processing circuitry 712 may capture and process a single frame of video data or may process more than one frame of video data. For example, video processing circuitry 712 may process a single frame to identify a person depicted in the frame, or a set of consecutive frames to determine whether a person depicted in the set of frames is the subject of an audio signature by analyzing the movement of the mouth of the person. If a depicted subject is identified, the audio signature is stored 720 in storage 702 in association with an identifier 722 of the source. In some embodiments, video processing circuitry 712 also captures as an image a portion of at least one frame in which the subject is depicted and stores the image in association with the audio signature, or in association with an identifier of the subject. Alternatively, video processing circuitry 712 stores an identifier of a particular frame in which the subject is depicted and a set of coordinates identifying a portion of the frame that depicts the subject.

During playback of content 102, input circuitry 704 receives command 724 from a user input device to repeat a portion of content. Upon receiving command 724, input circuitry 704 transmits an instruction 726 to media playback circuitry 706 to pause playback of the content 102 and an instruction 728 to storage 702 to retrieve audio signatures and/or action signatures within a threshold amount of time prior to the time at which the command 724 was received. For example, input circuitry 704 may instruct storage 702 to retrieve signatures with timestamps within the last thirty seconds prior to the timestamp at which the content 102 is paused. The retrieved signatures are transmitted 730 from storage 702 to control circuitry 700. Control circuitry 700, using video output circuitry 718, generates for display a number of icons, each icon representing a subject of one of the retrieved audio signatures. The icons are then displayed 732 as an overlay over the paused content 102.

Upon receiving selection 734 of an icon, input circuitry 704 transmits an instruction 736 to media playback circuitry 706 to replay the portion of content 102 corresponding to the signature represented by the selected icon. Media playback circuitry 706 retrieves the media data and transmits 738a audio of the retrieved media data to audio output circuitry 716 and for output 740 and transmits 738b video of the retrieved media data to video output circuitry 718 for output 732.

Figure 8:
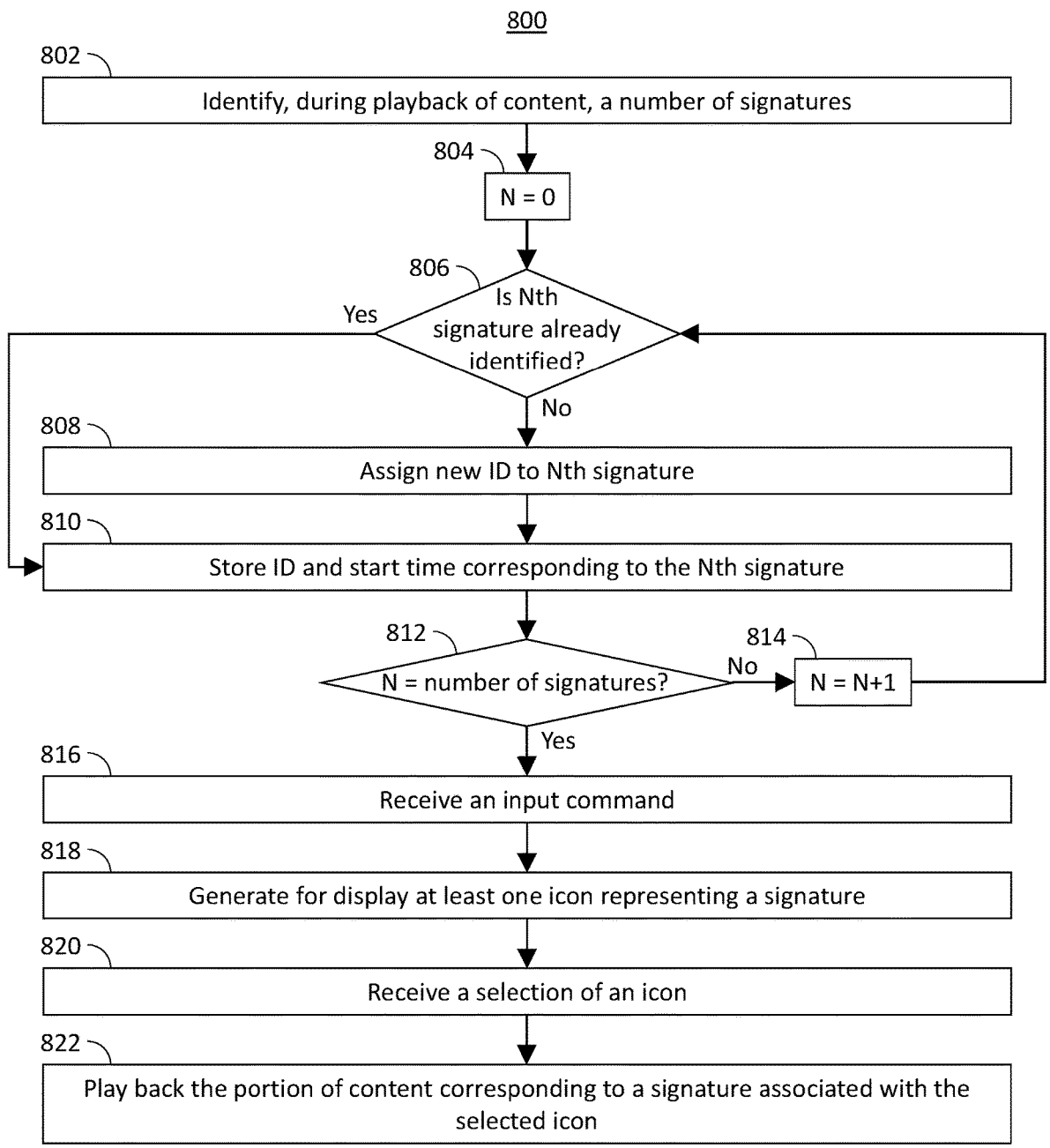
FIG. 8 is a flowchart representing a process for repeating a portion of content in accordance with some embodiments of the disclosure.

FIG. 8 is a flowchart representing an illustrative process 800 for resolving a query to repeat a portion of content in accordance with some embodiments of the disclosure. Process 800 may be implemented on control circuitry 700. In addition, one or more actions of process 800 may be incorporated into or combined with one or more actions of any other process or embodiment described herein.

At 802, control circuitry 700, using audio processing circuitry 710 and/or video processing circuitry 712, identifies, during playback of content 102, a plurality of signatures. This may be accomplished using methods described below in connection with FIG. 12. Audio processing circuitry 710 and/or video processing circuitry 712 may identify one signature in content 102 at a time or may identify multiple signatures simultaneously.

At 804, control circuitry 700 initializes a counter variable N with a value of 0. For each identified signature, control circuitry 700 determines, at 806, whether a previously identified subject is the subject of the current signature. For example, control circuitry 700 compares the audio characteristics of previous audio signatures to those of the current audio signature. As another example, control circuitry 700 compares objects and characters displayed in a frame of video to parameters of previously identified subjects. If the audio characteristics of the current audio signature do not match those of any of the previous audio signatures, or if no object or character currently displayed matches a previously identified subject, then, at 808, control circuitry 700 assigns a new identifier as the subject of the signature. If the audio characteristics of the current audio signature do match those of a previous audio signature or if an object or character currently displayed matches a previously identified subject, then control circuitry 700 determines that the subject of the current signature is the same as the subject of the previous signature having matching audio characteristics or image parameters and, at 810, assigns the subject identifier of the previous signature to the current signature. Control circuitry 700 then stores the identifier of the current signature and a start time corresponding to the current signature in storage 702. At 812, control circuitry 700 determines whether all identified signatures have yet been processed by comparing the value of N to the number of signatures identified. If there are more signatures to process then, at 814, control circuitry 700 increments the value of N by one and processing returns to step 806.

At 816, control circuitry 700, using input circuitry 704, receives an input command. The input command may be a command to pause playback of the content, or a command to repeat a portion of the content. For example, input circuitry 704 may include a microphone for receiving a voice command, an infrared receiver for receiving a command from a remote control, a WiFi or Bluetooth module for receiving commands from a device such as a tablet or smartphone, or any other suitable circuitry for receiving input commands.

At 818, control circuitry 700, using video output circuitry 718, generates for display a plurality of icons (e.g., 112a-112d), each icon representing a subject associated with the retrieved signatures. At 820, control circuitry 700, using input circuitry 704, receives a selection of an icon. In response to receiving the selection, control circuitry 700 retrieves the timestamp of the signature associated with the selected icon. At 822, control circuitry 700, using media playback circuitry 706, retrieves the portion of content 102 corresponding to the timestamp of the signature and plays back the portion of the content using audio output circuitry 716 and video output circuitry 718. If multiple audio signatures coincide, control circuitry 700 may, using audio processing circuitry 710, isolate audio data from the subject of an audio signature as described below in connection with FIG. 14.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
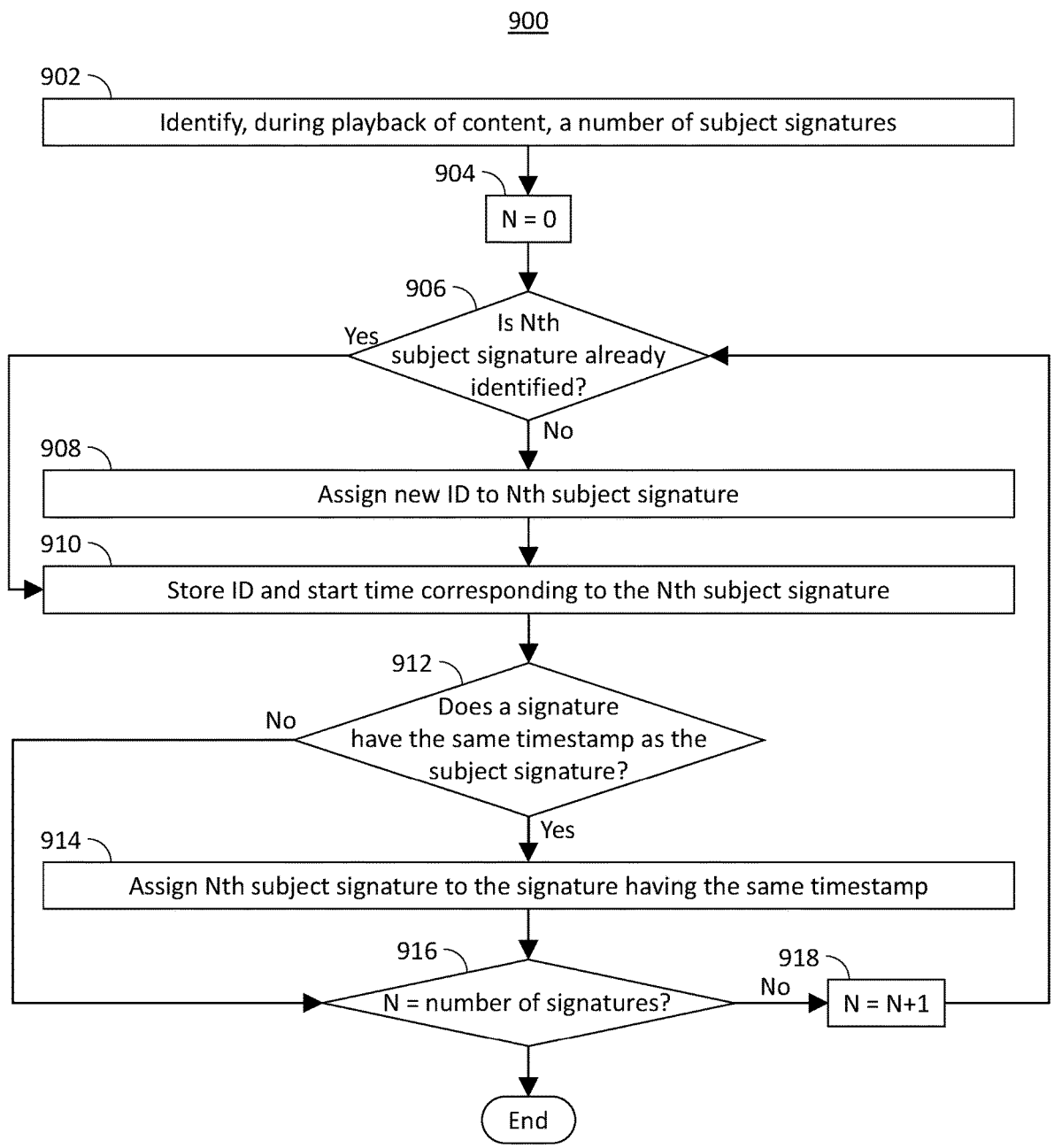
FIG. 9 is a flowchart representing a process for assigning a subject signature to an audio signature or action signature is accordance with some embodiments of the disclosure.

FIG. 9 is a flowchart representing an illustrative process 900 for assigning a subject signature to an audio signature or action signature in accordance with some embodiments of the disclosure. Process 900 may be implemented on control circuitry 700. In addition, one or more actions of process 900 may be incorporated into or combined with one or more actions of any other process or embodiment disclosed herein.

At 902, control circuitry 700 identifies, during playback of content 102, at least one subject signature. For example, control circuitry 700, using video processing circuitry 712, analyzes at least one video frame of content 102. Using edge detection, facial detection, or any other suitable image processing or video processing techniques, video processing circuitry 712 identifies a subject signature of at least one subject displayed in the video frame. Control circuitry 700 stores, in storage 702, a set of parameters corresponding to the visual characteristics of each displayed subject.

At 904, control circuitry 700 initializes a counter variable N with a value of 0. For each identified subject signature, control circuitry 700 determines, at 906, whether a previously identified subject is the subject of the current signature. For example, control circuitry 700 compares the parameters of previous subject signatures to those of the current subject signature. If the parameters of the current subject signature do not match those of any of the previous subject signatures or if no subject currently displayed matches a previously identified subject, then, at 908, control circuitry 700 assigns a new identifier to the subject signature. If the parameters of the current subject signature do match those of a previous subject signature or if a subject currently displayed matches a previously identified subject, then control circuitry 700 determines that the subject of the current signature is the same as the subject of the previous signature having matching parameters and, at 910, assigns the subject identifier of the previous signature to the current signature. Control circuitry 700 then stored the subject identifier and a start time corresponding to the subject signature in storage 702.

At 912, control circuitry 700 determines whether any audio signature or action signature has the same timestamp as the current subject signature. If no audio signature or action signature has the same timestamp as the current subject signature, then processing proceeds to step 916. If an audio signature or action signature has the same timestamp as the current subject signature, then, at 914, control circuitry 700 assigns the current subject signature to the audio signature or action signature having the same timestamp. After assigning the current subject signature to the audio signature or action signature having the same timestamp, at 916, control circuitry 700 determines whether all identified signatures have yet been processed by comparing the value of N to the number of signatures identified. If there are more signatures to process then, at 916, control circuitry 700 increments the value of N by one and processing returns to step 906.

The action or descriptions of FIG. 9 may be used with any other embodiment of this disclosure. In addition, the actions and descriptions described in related to FIG. 9 may be done in suitable alternative orders or in parallel to further the purposes of this disclosure.

Figure 10:
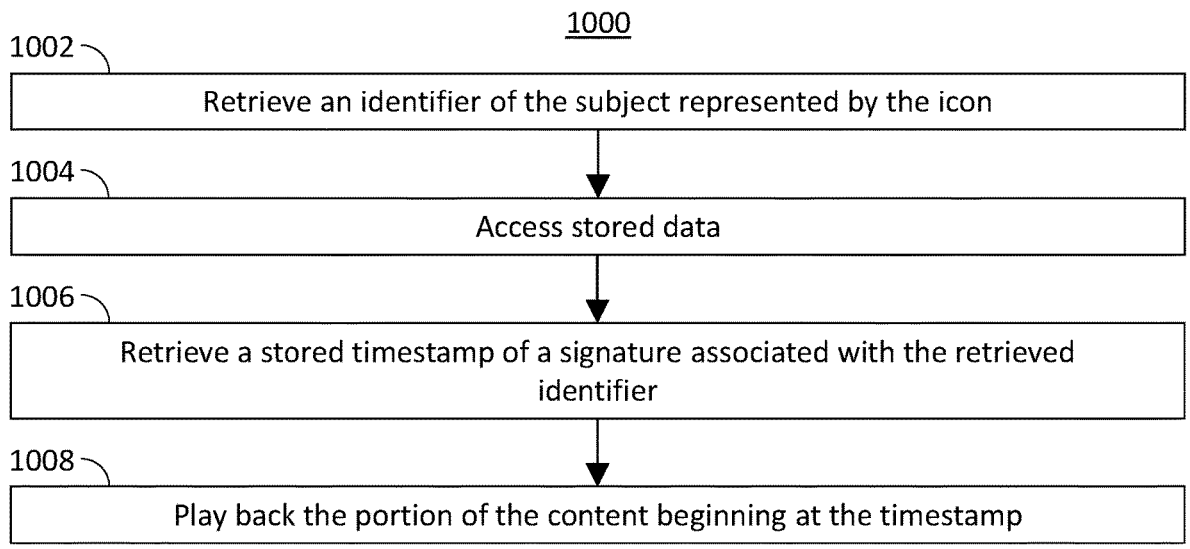
FIG. 10 is a flowchart representing a process for playing back a portion of content in accordance with some embodiments of the disclosure.

FIG. 10 is a flowchart representing an illustrative process 1000 for playing back a portion of audio in accordance with some embodiments of the disclosure. Process 1000 may be implemented on control circuitry 700. In addition, one or more actions of process 1000 may be incorporated into or combined with one or more actions of any other process or embodiment described herein.

At 1002, control circuitry 700 retrieves an identifier of the subject represented by an icon. For example, when generating an icon for display, control circuitry 700 may include metadata for the icon including the subject identifier. In another example, control circuitry 700 generates a link or other computer code that includes a reference or pointer to the source identifier.

At 1004, control circuitry 700 accesses a database or other data structure in storage 702 in which signatures are stored in association with identifiers of subjects. At 1006, control circuitry 700 retrieves, from the database or data structure, a timestamp of a signature associated with the retrieved subject identifier. At 1008, control circuitry 700, using media playback circuitry 706, plays back the portion of the audio of content 102 beginning at the retrieved timestamp.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
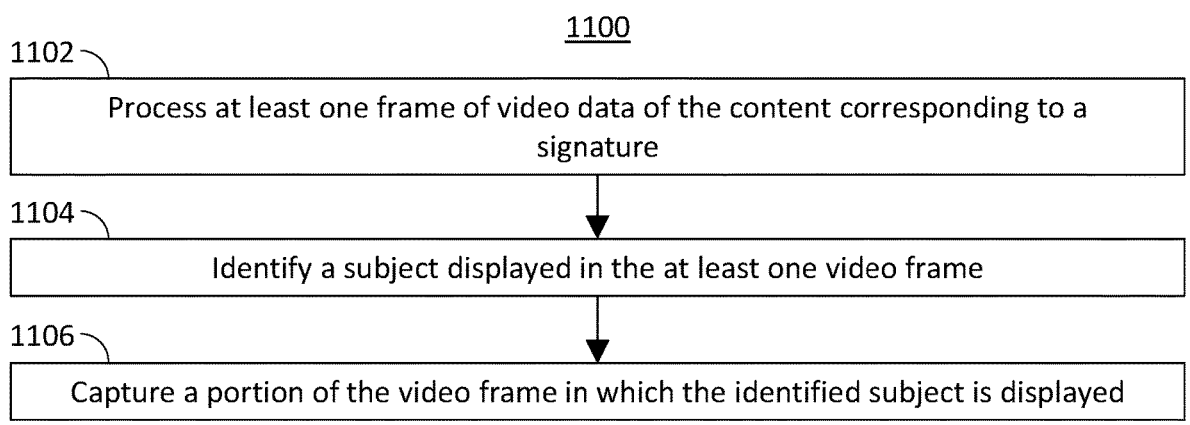
FIG. 11 is a flowchart representing a process for capturing an image of a subject from video data in accordance with some embodiments of the disclosure.

FIG. 11 is a flowchart representing an illustrative process 1100 for capturing an image of an audio source from video data in accordance with some embodiments of the disclosure. Process 1100 may be implemented on control circuitry 700. In addition, one or more actions of process 1100 may be incorporated into or combined with one or more actions of any other process or embodiment described herein.

At 1102, control circuitry 700, using video processing circuitry 712, processes at least one frame of video data of content 102 corresponding to a signature and, at 1104, identifies a subject displayed in the at least one frame. For example, video processing circuitry 712 may use edge detection, facial recognition, object recognition, or any other suitable video processing or image processing technique to identify objects or characters displayed in the frame. If more than one frame is processed, video processing circuitry 712 may compare the frames to determine if, for example, the mouth of a character is moving during playback of the signature.

At 1106, video processing circuitry 712 captures a portion of the video frame in which the identified subject is displayed. Video processing circuitry 712 may capture image data from the frame and store the image in storage 702 in association with the signature. Alternatively, video processing circuitry 712 may capture coordinates bounding an area of the frame in which the identified source is displayed and store in storage 702 the coordinates, as well as an identifier of the frame, in association with the signature.

It is contemplated that the actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
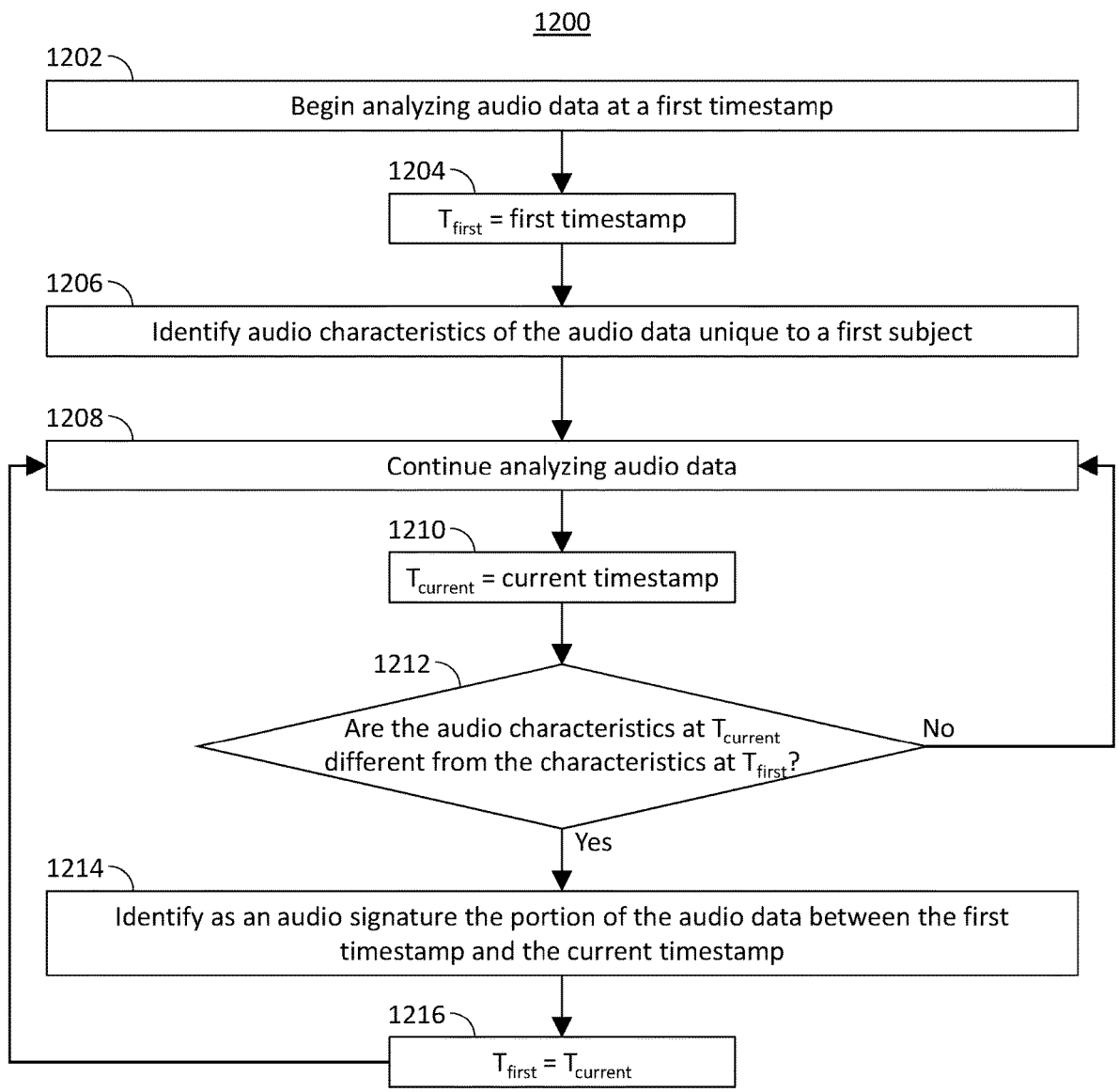
FIG. 12 is a flowchart representing a process for identifying audio signatures in accordance with some embodiments of the disclosure.

FIG. 12 is a flowchart representing an illustrative process 1200 for identifying audio signatures in accordance with some embodiments of the disclosure. Process 1200 may be implemented on control circuitry 700. In addition, one or more actions of process 1200 may be incorporated into or combined with one or more actions of any other process or embodiment described herein.

At 1202, control circuitry 700, using audio processing circuitry 710, begins analyzing audio data of content 102 at a first timestamp. At 1204, control circuitry 700 initializes a variable $T_{first}$ and sets as its value the first timestamp. At 1206, audio processing circuitry 710 identifies audio characteristics of the audio data, which are unique to a first source. For example, audio processing circuitry 710 may use frequency analysis, rhythm analysis, harmonics, tempo, or any other audio characteristics to uniquely identify audio as being from a particular source. At 1208, audio processing circuitry 710 continues analyzing the audio data.

At 1210, control circuitry 700 initializes a variable $T_{current}$ and sets its value as the timestamp corresponding to the audio data currently being analyzed. At 1212, audio processing circuitry 710 determines whether the audio characteristics at $T_{current}$ are different from the audio characteristics at $T_{first}$. For example, audio processing circuitry 710 may compare a set of audio characteristics at $T_{current}$ with those identified at $T_{first}$ to identify whether the value of any characteristic has changed by at least a threshold amount, such as five percent. If no change is detected, processing returns to 1208, at which audio processing circuitry 710 continues analyzing the audio data.

If the audio characteristics at $T_{current}$ are determined to be different from the audio characteristics at $T_{first}$, then, at 1214, audio processing circuitry 710 identifies as an audio signature the portion of audio data from $T_{first}$ to $T_{current}$. Audio processing circuitry 710 stores the audio signature in storage 702 along with at least $T_{first}$. At 1216, control circuitry 700 sets the value of $T_{first}$ to the value of $T_{current}$, and processing returns to 1208.

It is contemplated that the actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
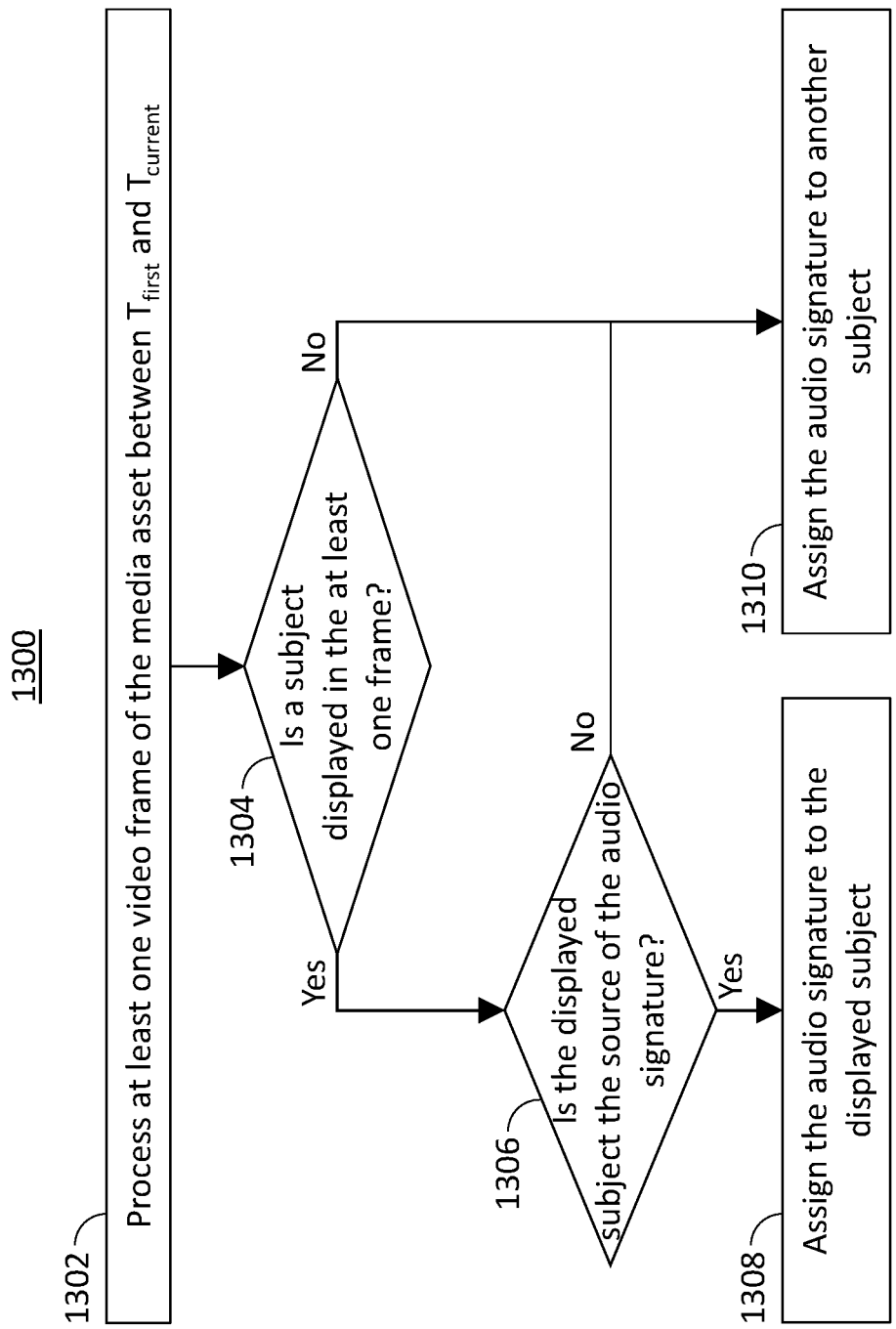
FIG. 13 is a flowchart representing a process for assigning audio signatures to a subject in accordance with some embodiments of the disclosure.

FIG. 13 is a flowchart representing an illustrative process 1300 for assigning audio signatures to a subject in accordance with some embodiments of the disclosure. Process 900 may be implemented on control circuitry 700. In addition, one or more actions of process 900 may be incorporated into or combined with one or more actions of any other process or embodiment described herein.

At 1302, control circuitry 700, using video processing circuitry 712, processes at least one video frame from a portion of content 102 between $T_{first}$ and $T_{current}$. At 1304, video processing circuitry 712 determines whether a subject is displayed in the at least one frame. Video processing circuitry 712 may use edge detection, facial recognition, object recognition, or any other suitable video processing or image processing technique.

If a subject displayed is displayed in the at least one frame, then, at 1306, control circuitry 700 determines whether the displayed subject is the source of an audio signature. For example, control circuitry 700 may compare, using audio processing circuitry 710 and video processing circuitry 712, the audio signature with the at least one frame of video data. Audio processing circuitry 710 may identify a type of audio signature based on audio characteristics. For example, audio processing circuitry 710 may identify a low frequency speech pattern as a male voice. Control circuitry 700 may then use video processing circuitry 712 to identify a male figure in the at least one video frame. Video processing circuitry 412 may identify a character whose mouth is moving during the audio signature.

If the displayed subject is the source of the audio signature, then, at 1308, control circuitry 700 assigns the audio signature to the displayed source. For example, control circuitry 700 may update the database or data structure in storage 702 to include an identifier of the subject in association with the audio signature.

If no subject is displayed in the at least one frame, or if a displayed subject is not the source of the audio signature, then, at 1310, control circuitry 700 assigns the audio signature to another subject. Control circuitry 700 may, using audio processing circuitry 710, compare the audio characteristics of the audio signature with other audio signatures having known subjects. If a match is detected, control circuitry 700 may assign as a subject of the audio signature the subject of the audio signature having matching audio characteristics. If no matches are detected, control circuitry 700 may assign a new or temporary subject identifier to the audio signature.

It is contemplated that the actions or descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
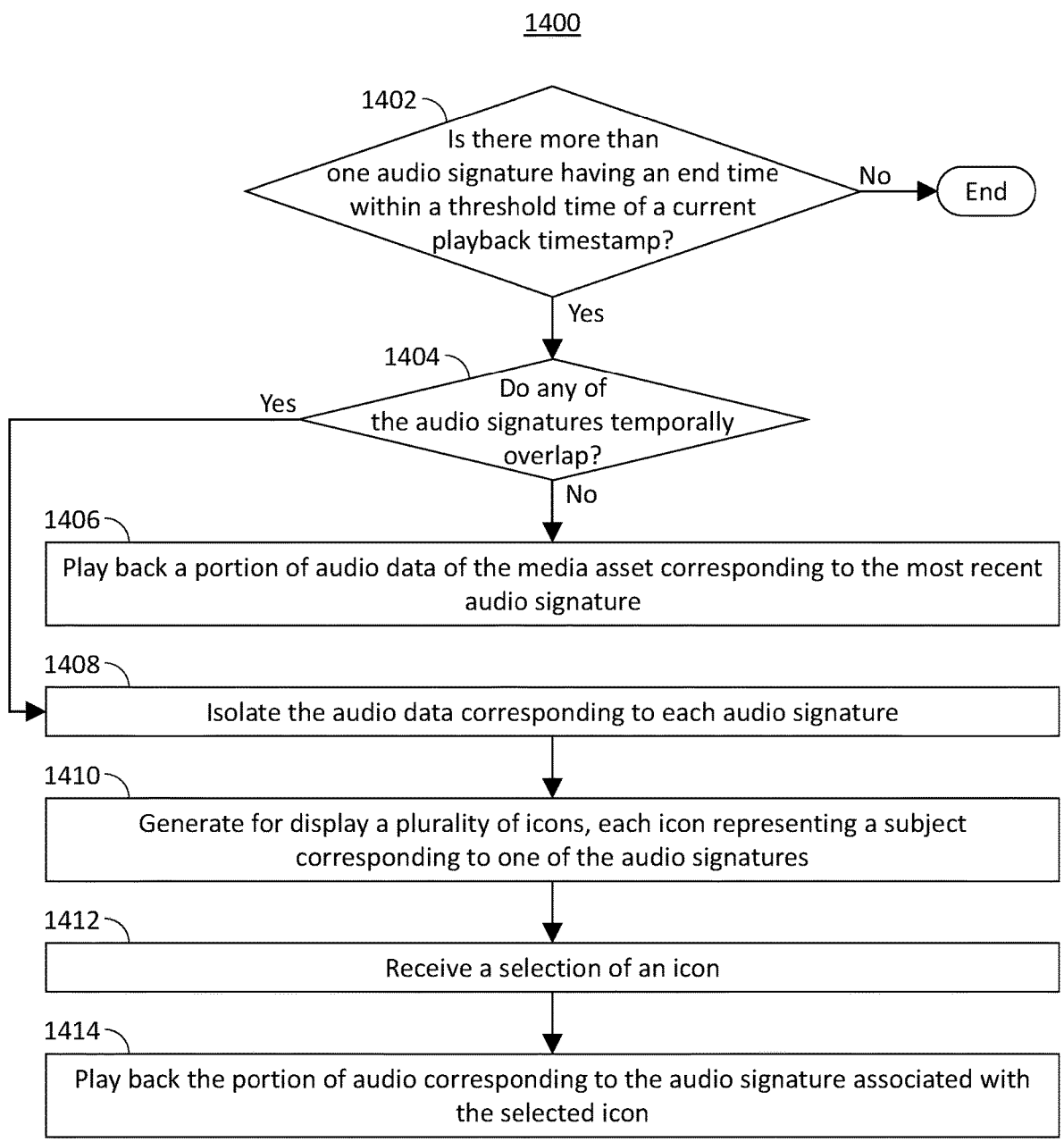
FIG. 14 is a flowchart representing a process for playing back one of a plurality of portions of audio in accordance with some embodiments of the disclosure.

FIG. 14 is a flowchart representing an illustrative process 1400 for playing back one of a plurality of portions of audio in accordance with some embodiments of the disclosure. Process 1400 may be implemented on control circuitry 400. In addition, one or more actions of process 1400 may be incorporated into or combined with one or more actions of any other process or embodiment described herein.

At 1402, control circuitry 700 determines whether more than one audio signature has an end time within a threshold time of a current playback timestamp. For example, in a portion of content 102 in which several characters have a conversation, several audio signatures may end within thirty seconds of the current playback position and will be returned in response to a query for audio signatures present within the threshold period.

At 1404, control circuitry 700 determines whether any of the audio signatures ending within the threshold period temporally overlap. For example, two characters may speak simultaneously, resulting in at least one audio signature ending at the same time as, or between the start time and end time of, another audio signature. If no audio signatures temporally overlap, then, at 1406, control circuitry 700 plays back a portion of audio data of content 102 corresponding to the most recent audio signature. However, if any audio signatures temporally overlap, then, at 1408, control circuitry 700, using audio processing circuitry 710, isolates the audio data corresponding to each audio signature. Audio processing circuitry 710 may use audio characteristics of each audio signature to isolate frequencies and harmonics unique to each signature. Audio processing circuitry 710 may suppress frequencies associated with background noise. Audio processing circuitry 710 may extract or copy audio data representing each individual audio signature and generate individual audio samples corresponding to each audio signature.

At 1410, control circuitry 700, using video output circuitry 718, generates for display a plurality of icons, each icon representing a subject corresponding to one of the audio signatures. At 1412, control circuitry 700, using input circuitry 704, receives a selection of an icon and, at 1414, plays back, using media playback circuitry 706, a portion of at least the audio of content 102 corresponding to the audio signature associated with the selected icon. This may be an extracted audio sample as described above.

It is contemplated that the actions or descriptions of FIG. 14 may be used with any other embodiment of this disclosure. In addition, the actions and descriptions described in relation to FIG. 14 may be done in suitable alternative orders or in parallel to further the purposes of this disclosure.

Figure 15:
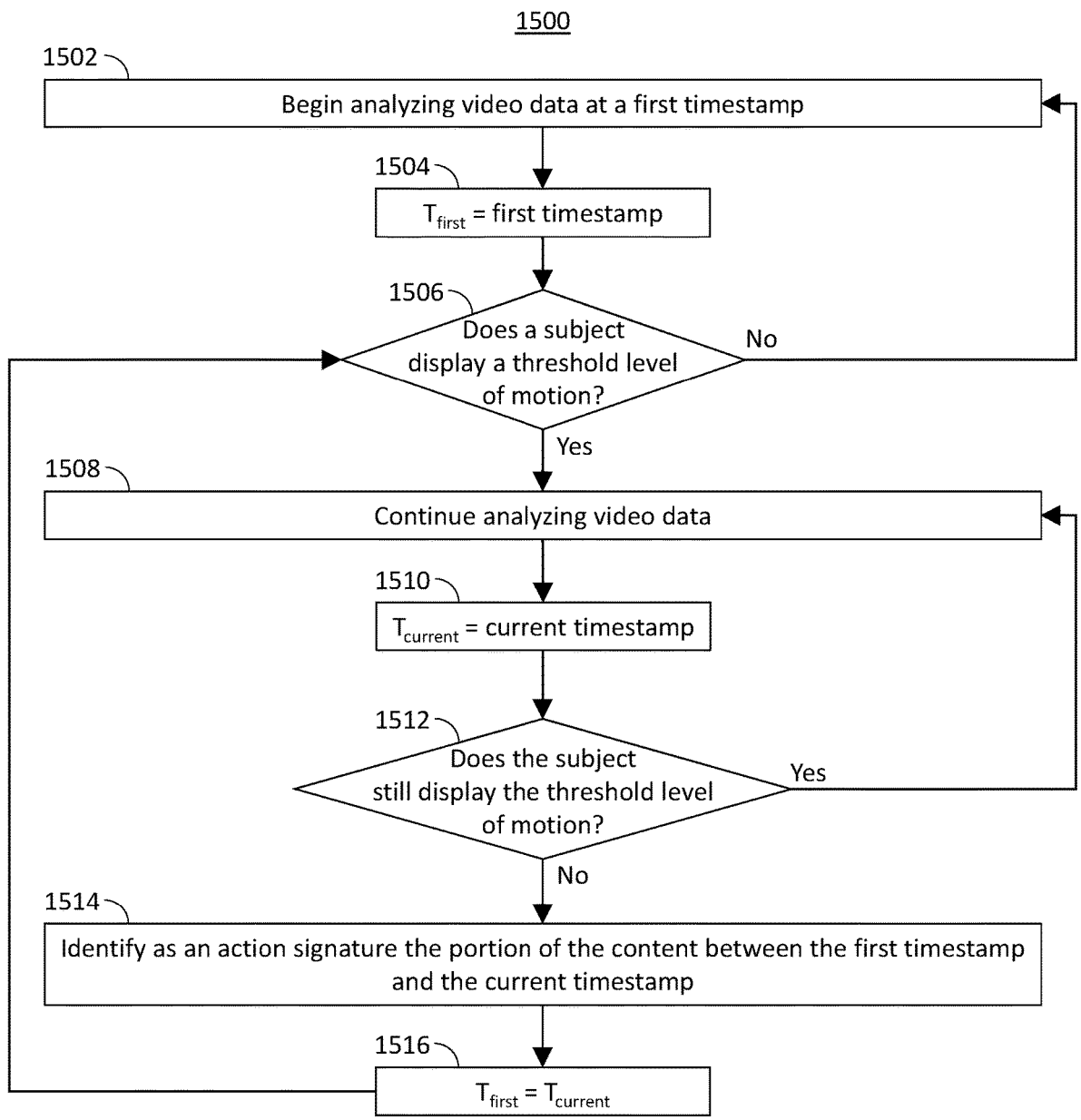
FIG. 15 is a flowchart representing a process for identifying action signatures in accordance with some embodiments of the disclosure.

FIG. 15 is a flowchart representing an illustrative process 1500 for identifying action signatures in accordance with some embodiments of the disclosure. Process 1500 may be implemented on control circuitry 700. In addition, one or more actions of process 1500 may be incorporated into or combined with one or more actions of any other process or embodiment described herein.

At 1502, control circuitry 700, using video processing circuitry 712, begins analyzing video data of content 102 at a first timestamp. At 1504, control circuitry 700 initializes a variable $T_{first}$ and sets as its value the first timestamp. At 1506, video processing circuitry 712 determines whether a subject displayed in the video data of content 102 displays a threshold level of motion. For example, video processing circuitry 712 may compare the position of each subject in a frame at the first timestamp with that of a previous frame to determine a distance traveled between the two frames. If no subject displays a threshold level of motion, processing returns to step 1502.

If a subject does display a threshold level of motion, then, at 1508, video processing circuitry 712 continues analyzing the video data. At 1510, control circuitry 700 initializes a variable $T_{current}$ and sets its value as the timestamp corresponding to the video data currently being analyzed. At 1512, video processing circuitry 712 determines whether the motion of the subject at $T_{current}$ is still at or above the threshold level of motion. If so, processing returns to 1508, at which video processing circuitry 712 continues analyzing the video data.

If the motion of the subject at $T_{current}$ is determined to be below the threshold level of motion, then, at 1514, video processing circuitry 712 identifies as an action signature the portion of video data from $T_{first}$ to $T_{current}$. Video processing circuitry 712 stores the action signature in storage 702 along with at least $T_{first}$. At 1516, control circuitry 700 sets the value of $T_{first}$ to the value of $T_{current}$, and processing returns to 1506.

It is contemplated that the actions or descriptions of FIG. 15 may be used with any other embodiment of this disclosure. In addition, the actions and descriptions described in relation to FIG. 15 may be done in suitable alternative orders or in parallel to further the purposes of this disclosure.

Figure 16:
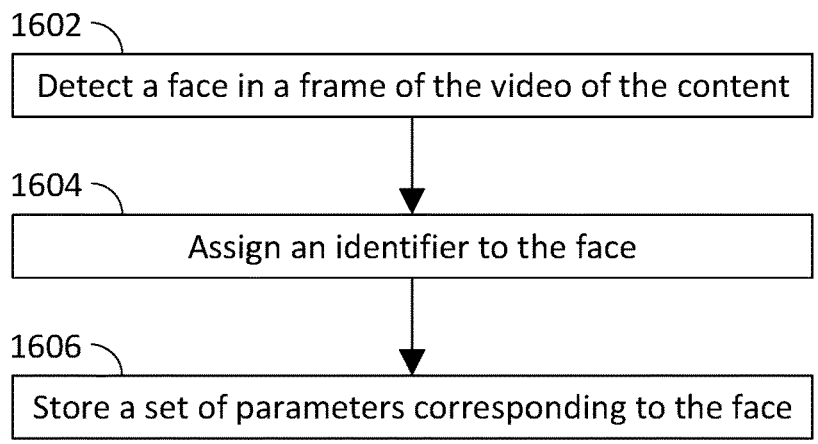
FIG. 16 is a flowchart representing a process for identifying a subject displayed in content in accordance with some embodiments of the disclosure.

FIG. 16 is a flowchart representing an illustrative process 1600 for identifying a subject displayed in content in accordance with some embodiments of the disclosure. Process 1600 may be implemented on control circuitry 700. In addition, one or more actions of process 1600 may be incorporated into or combined with one or more actions of any other process or embodiment described herein.

At 1602, control circuitry 700, using video processing circuitry 712, detects a face in a frame of the video of content 102. Video processing circuitry 712 may use any suitable video processing or image processing technique to identify faces displayed in video data of content 102. Video processing circuitry 712 may identify a set of image parameters which uniquely identify the detected face, such as inter-pupil distance (i.e., the distance between the left and right pupils of the face's eyes), nose size or position, ear size or position, hair color, eye color, overall face shape, etc. Video processing circuitry 712 may also employ a Haar algorithm or local binary patterns algorithm to identify faces. At 1604, video processing circuitry 712 assigns an identifier to the detected face. At 1606, video processing circuitry 712 stores, in storage 702, the set of parameters corresponding to the face in association with the assigned identifier.

It is contemplated that the actions or descriptions of FIG. 16 may be used with any other embodiment of this disclosure. In addition, the actions and descriptions described in relation to FIG. 16 may be done in suitable alternative orders or in parallel to further the purposes of this disclosure.

Figure 17:
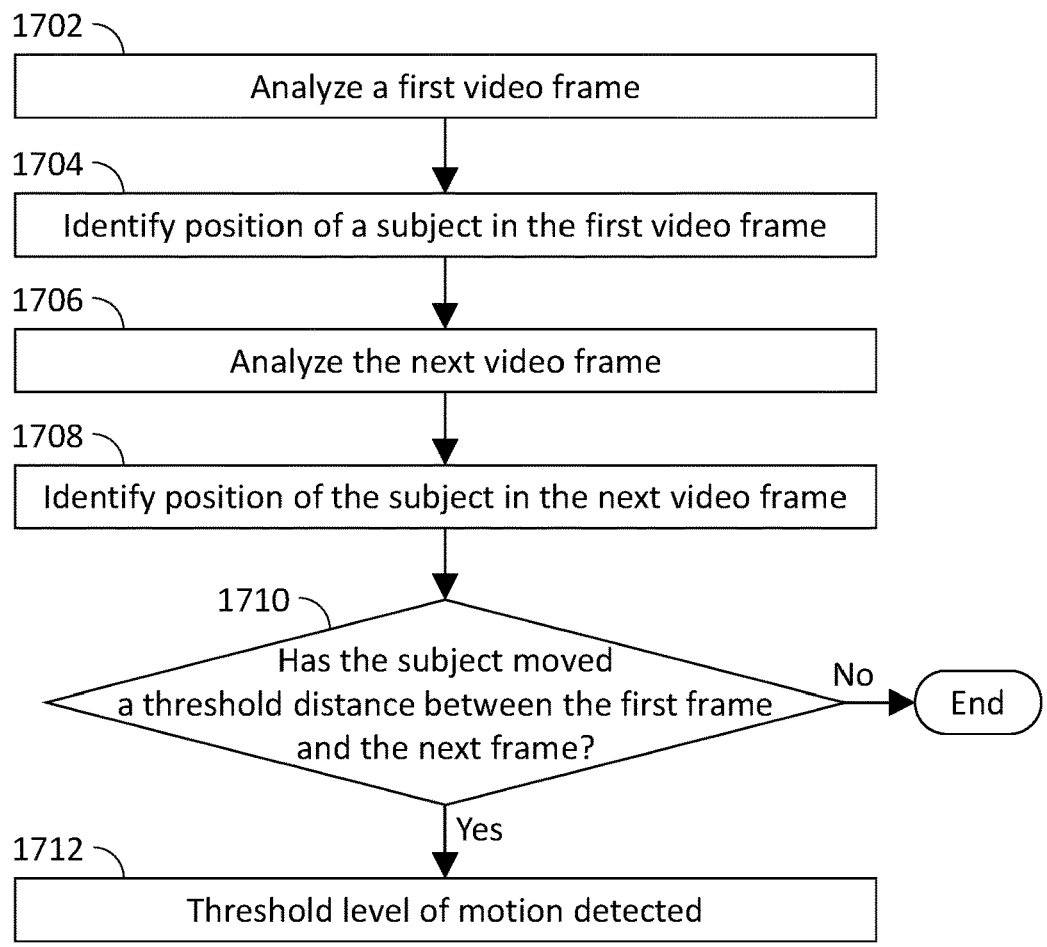
FIG. 17 is a flowchart representing a process for detecting a threshold level of motion in accordance with some embodiment of the disclosure.

FIG. 17 is a flowchart representing an illustrative process 1700 for detecting a threshold level of motion in accordance with some embodiment of the disclosure. Process 1700 may be implemented on control circuitry 700. In addition, one or more actions of process 1700 may be incorporated into or combined with one or more actions of any other process or embodiment described herein.

At 1702, control circuitry 700, using video processing circuitry 712, analyzes a first video frame of content 102. Video processing circuitry identifies at least one subject displayed in the first video frame using methods described above in connection with FIG. 9. At 1704, video processing circuitry 712 identifies a position of a subject in the first video frame. For example, video processing circuitry 712 identifies x and y coordinates of a corner of the subject. If the subject is of an irregular shape, such as a character's face, video processing circuitry 712 may first define a bounding box having a top-left corner corresponding to a point directly to the left of the top-most pixel of the subject and directly above the left-most pixel of the subject, and a bottom-right corner corresponding to a point directly to the right of the bottom-most pixel of the subject and directly below the right-most pixel of the subject. Video processing circuitry 712 may then identify a position of the bounding box.

At 1706, video processing circuitry 712 analyzes the next frame of video of content 102 and, at 1708, identifies the position of the subject in the next frame of video using the methods described above. At 1710, video processing circuitry 712 determines whether the subject has moved a threshold distance between the two frames analyzed. For example, video processing circuitry 712 may calculate the difference between the position of the object or of the bounding box in each of the frames and determine whether the object moved more than a threshold number of pixels. Video processing circuitry 712 may also account for motion toward or away from the viewer by comparing the apparent size of the object between the two frames and determining whether the size has increased or decreased by a threshold amount. Video processing circuitry 712 may use both of these calculations to determine three-dimensional motion of the subject. Video processing circuitry 712 may calculate a vector in a three-dimensional space along which the subject has moved and determine the distance traveled along the vector. If the subject has moved a threshold distance, then, at 1712, video processing circuitry 712 identifies that a threshold level of motion has been detected.

It is contemplated that the actions or descriptions of FIG. 17 may be used with any other embodiment of this disclosure. In addition, the actions and descriptions described in relation to FIG. 17 may be done in suitable alternative orders or in parallel to further the purposes of this disclosure.

Figure 18:
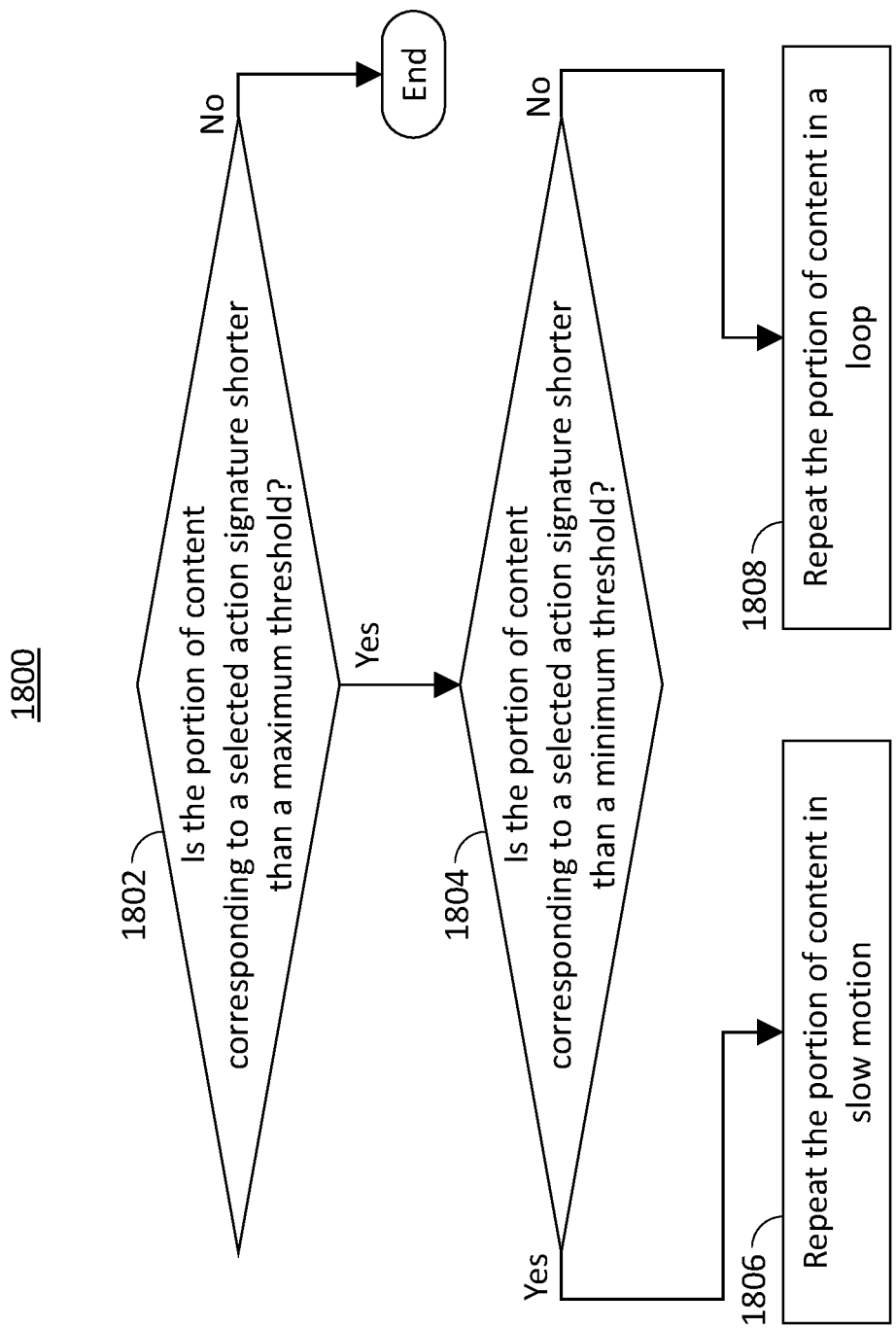
FIG. 18 is a flowchart representing a process for repeating a portion of content in slow motion or in a loop in accordance with some embodiments of the disclosure.

FIG. 18 is a flowchart representing an illustrative process 1800 for repeating a portion of content in slow motion or in a loop in accordance with some embodiments of the disclosure. Process 1800 may be implemented on control circuitry 700. In addition, one or more actions of process 1800 may be incorporated into or combined with one or more actions of any other process or embodiment described herein.

At 1802, control circuitry 700 determines whether the portion of the content 102 corresponding to a selected action signature is shorter than a maximum threshold, such as thirty seconds. If the portion of the content 102 is shorter than the maximum threshold, then, at 1804, control circuitry 700 determines whether the portion of the content 102 is also shorter than a minimum threshold, such as five seconds. If the portion of the content 102 corresponding to the selected action signature is shorter than the minimum threshold, then, at 1806, control circuitry 700, using media playback circuitry 706, repeats the portion of the content 102 in slow motion. If the length of the portion of the content 102 corresponding to the selected action signature is between the minimum threshold and the maximum threshold, then, at 1808, control circuitry 700, using media playback circuitry 706, repeats the portion of the content 102 in a loop. Media playback circuitry 706 may continue looping the portion of content 102 until another input command is received. Alternatively or additionally, media playback circuitry 706 may continue looping the portion of content 102 for a predetermined number of loops (e.g., five loops) or a predetermined amount of time (e.g., thirty seconds).

It is contemplated that the actions or descriptions of FIG. 18 may be used with any other embodiment of this disclosure. In addition, the actions and descriptions described in relation to FIG. 18 may be done in suitable alternative orders or in parallel to further the purposed of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for displaying subjects of a portion of video of content, the method comprising:
   during playback of content:
      automatically detecting, a plurality of motions in the video of the content;
      automatically identifying an action signature corresponding to each motion of the plurality of motions in the video of the content;
   storing each action signature corresponding to the respective motion in the video of the content, a start timestamp at which the respective motion corresponding to the respective action signature begins, an end timestamp at which the respective motion corresponding to the respective action signature ends, and an identifier of the action signature;
   receiving an input command;
   generating for display an icon representing each action signature;
   receiving a second input command comprising a selection of an icon, wherein the second input command comprises a number of selections of an icon;
   playing back the portion of the content corresponding to the action signature associated with the selected icon;
   retrieving a plurality of action signatures assigned to the subject of motion represented by the selected icon; and
   identifying an action signature of the plurality of action signatures that precedes a current playback timestamp by the number of selections of the icon, wherein the stored start timestamp is retrieved from the identified action signature.

2. The method of claim 1, further comprising:
   identifying, during playback of the content, a subject signature corresponding to each of a plurality of subjects in the video of the content;
   storing, for each subject signature, a second timestamp at which the respective subject signature begins, and an identifier of the respective subject signature; and
   assigning a subject signature to an action signature present during the subject signature based on the start timestamp and the second timestamp.

3. The method of claim 1, wherein playing back the portion of the content corresponding to an action signature associated with the selected icon comprises:
   retrieving an identifier of the subject represented by the selected icon;
   retrieving the stored start timestamp of an action signature associated with the retrieved identifier; and
   playing back the portion of the content beginning at the retrieved start timestamp.

4. The method of claim 1, further comprising:
   capturing an image of the subject of each identified motion; and
   wherein the icon representing an action signature comprises the captured image of the subject of the motion corresponding to the action signature.

5. The method of claim 1, wherein identifying an action signature comprises:
   identifying, during playback of content, a subject of motion displayed in video of the content;
   storing an identifier of the subject of motion;
   detecting, at a first timestamp, a threshold level of motion of a respective subject of motion;
   detecting, at a subsequent timestamp, that the motion of the respective subject of motion is below the threshold level; and
   identifying as a first action signature the portion of the content between the first timestamp and the subsequent timestamp;

wherein the stored start timestamp corresponds to the first timestamp and the stored end timestamp corresponds to the subsequent timestamp.

6. The method of claim 5, wherein identifying a subject of motion displayed in the video of the content comprises:
detecting a face in a frame of the video of the content;
assigning an identifier to each detected face; and
storing, for each detected face, a set of parameters corresponding to the respective detected face;
wherein the stored identifier of a respective subject of motion is the assigned identifier of the respective detected face associated with the respective subject of motion.

7. The method of claim 6, wherein detecting a threshold level of motion of a respective subject of motion comprises:
analyzing a plurality of consecutive frames of the video of the content; and
determining, based on the analyzing, that the respective subject of motion has moved more than a threshold distance in less than a threshold number of frames.

8. The method of claim 1, further comprising storing action signatures in a metadata file for distribution with the content.

9. The method of claim 1, further comprising:
determining whether a time between the start timestamp and the end timestamp is below a minimum threshold amount of time;
wherein, in response to determining that the time between the start timestamp and the end timestamp is below the minimum threshold amount of time, playback of the content is performed in slow motion.

10. The method of claim 1, further comprising:
determining whether a time between the start timestamp and the end timestamp is between a minimum threshold amount of time and a maximum threshold amount of time;
wherein, in response to determining that the time between the start timestamp and the end timestamp is between the minimum threshold amount of time and the maximum threshold amount of time, playback of the content is looped.

11. A system for displaying subjects of a portion of video of content, the system comprising:
memory, and
control circuitry configured to:
automatically detect, during playback of content, a plurality of motions in the video of the content;
automatically identify, during playback of content, an action signature corresponding to each motion of a plurality of motions in the video of the content;
store, in the memory, each action signature corresponding to the respective motion in the video of the content, a start timestamp at which the respective motion corresponding to the respective action signature begins, an end timestamp at which the respective motion corresponding to the respective action signature ends, and an identifier of the action signature;
receive an input command;
generate for display an icon representing each action signatures;
receive a second input command comprising a selection of an icon, wherein the second input command comprises a number of selections of an icon;
play back the portion of the content corresponding to the action signature associated with the selected icon;
retrieve a plurality of action signatures assigned to a subject of motion represented by the selected icon; and
identify an action signature of the plurality of action signatures that precedes a current playback timestamp by the number of selections of the icon, wherein the stored start timestamp is retrieved from the identified action signature.

12. The system of claim 11, wherein the control circuitry is further configured to:
identify, during playback of the content, a subject signature corresponding to each of a plurality of subjects in the video of the content;
store, for each subject signature, a second timestamp at which the respective subject signature begins, and an identifier of the respective subject signature; and
assign a subject signature to an action signature present during the subject signature based on the start timestamp and the second timestamp.

13. The system of claim 11, wherein the control circuitry configures to play back the portion of the content corresponding to an action signature associated with the selected icon is further configured to:
retrieve an identifier of the subject represented by the selected icon;
retrieve the stored start timestamp of an action signature associated with the retrieved identifier; and
play back the portion of the content beginning at the retrieved start timestamp.

14. The system of claim 11, wherein the control circuitry is further configured to:
capture an image of the subject of each identified motion; and
wherein the icon representing an action signature comprises the captured image of the subject of the motion corresponding to the action signature.

15. The system of claim 11, wherein the control circuitry configured to identify an action signature is further configured to:
identify, during playback of content, a subject of motion displayed in video of the content;
store an identifier of the subject of motion;
detect, at a first timestamp, a threshold level of motion of a respective subject of motion;
detect, at a subsequent timestamp, that the motion of the respective subject of motion is below the threshold level; and
identify as a first action signature the portion of the content between the first timestamp and the subsequent timestamp;
wherein the stored start timestamp corresponds to the first timestamp and the stored end timestamp corresponds to the subsequent timestamp.

16. The system of claim 15, wherein the control circuitry configured to identify a subject of motion displayed in the video of the content is further configured to:
detect a face in a frame of the video of the content;
assign an identifier to each detected face; and
store, for each detected face, a set of parameters corresponding to the respective detected face;
wherein the stored identifier of a respective subject of motion is the assigned identifier of the respective detected face associated with the respective subject of motion.

17. The system of claim 16, wherein the control circuitry configured to detect a threshold level of motion of a respective subject of motion is further configured to:

analyze a plurality of consecutive frames of the video of the content; and determine, based on the analyzing, that the respective subject of motion has moved more than a threshold distance in less than a threshold number of frames.

18. The system of claim 11, wherein the control circuitry is further configured to store action signatures in a metadata file for distribution with the content.

19. The system of claim 11, wherein the control circuitry is further configured to:
   determine whether a time between the start timestamp and the end timestamp is below a minimum threshold amount of time;
   wherein, in response to determining that the time between the start timestamp and the end timestamp is below the minimum threshold amount of time, playback of the content is performed in slow motion.

20. The system of claim 11, wherein the control circuitry is further configured to:
   determine whether a time between the start timestamp and the end timestamp is between a minimum threshold amount of time and a maximum threshold amount of time;
   wherein, in response to determining that the time between the start timestamp and the end timestamp is between the minimum threshold amount of time and the maximum threshold amount of time, playback of the content is looped.

21. A method for displaying subjects of a portion of video of content, the method comprising:
   during playback of content:
   automatically detecting a plurality of motions in the video of the content;
   automatically identifying action signatures, each action signature corresponding to a motion of the plurality of motions in the video of the content;
   storing metadata associated with the content, the metadata comprising each action signature corresponding to the respective motion in the video of the content;
   receiving a first input command;
   identifying, from the metadata associated with the content, an action signature;
   retrieving, from the metadata, an identifier of a subject of motion associated with each identified action signature;
   generating for display an icon representing each respective retrieved subject of motion associated with a respective action signature;
   receiving a second input command comprising selection of an icon, wherein the second input command comprises a number of selections of an icon;
   in response to receiving the second input command, playing back the portion of the content corresponding to the action signature associated with the selected icon;
   retrieving a plurality of action signatures assigned to the subject of motion represented by the selected icon;
   retrieving, from the metadata, a start timestamp of each action signature of the plurality of action signatures; and
   identifying, based on the start timestamp of each action signature, an action signature of the plurality of action signatures that precedes a current playback timestamp by the number of selections of the icon.

22. The method of claim 21, wherein playing back the portion of the content corresponding to the action signature associated with the selected icon comprises:

retrieving, from the metadata, a start timestamp associated with the action signature; and
playing back the portion of the content beginning at the retrieved start timestamp.

23. The method of claim 21, further comprising:
retrieving a captured image of each identified subject of motion;
wherein the icon representing the respective subject of motion comprises the retrieved captured image.

24. The method of claim 21, wherein identifying an action signature comprises:
identifying a current playback timestamp of the content;
identifying a subject of motion displayed in the content at the current playback timestamp;
retrieving, from a database, an identifier of a subject of motion having a timestamp that is within a threshold amount of time of the current playback timestamp, wherein the database associates a start timestamp and an end timestamp with motion of an identified subject of motion; and
identifying, as an action signature, the portion of the content between the start timestamp and the end timestamp.

25. The method of claim 24, wherein identifying a subject of motion displayed in the content at the current playback timestamp comprises:
detecting a face in a frame of the video of the content;
comparing a set of parameters corresponding to the respective detected face with corresponding parameters of identified subjects of motion;
determining, based on the comparing, whether the respective detected face is an identified subject of motion; and
in response to determining that the respective detected face is an identified subject of motion, retrieving the identifier of the subject of motion.

26. The method of claim 25, wherein identifying a subject of motion displayed in the content at the current playback timestamp comprises:
detecting an edge in a frame of the video of the content;
comparing a set of parameters corresponding to a respective detected edge with corresponding parameters of identified subjects of motion;
determining, based on the comparing, whether the respective detected edge is an identified subject of motion; and
in response to determining that the respective detected edge is an identified subject of motion, retrieving the identifier of the subject of motion.

27. The method of claim 21, wherein the metadata is received with the content.

28. The method of claim 21, further comprising:
determining whether a temporal length of a motion associated with the action signature is below a minimum threshold amount of time;
wherein, in response to determining that the temporal length of the motion is below the minimum threshold amount of time, playback of the content is performed in slow motion.

29. The method of claim 21, further comprising:
determining whether a temporal length of a motion associated with the action signature is between a minimum threshold amount of time and a maximum threshold amount of time;
wherein, in response to determining that the temporal length of the motion is between the minimum threshold amount of time and the maximum threshold amount of time, playback of the content is looped.

30. A system for displaying subjects of a portion of video of content, the system comprising:
   memory; and
   control circuitry configured to:
      automatically detect, during playback of content, a plurality of motions in the video of the content;
      automatically identify, during playback of content, action signatures, each action signature corresponding to a motion of the plurality of motions in the video of the content;
      store metadata associated with the content, the metadata comprising, each action signature corresponding to the respective motion in the video of the content;
      receive, during playback of the content, a first input command;
      identify, from the metadata associated with the content, an action signature;
      retrieve, from the metadata, an identifier of a subject of motion associated with each identified action signature;
      generate for display an icon representing each respective retrieved subject of motion associated with a respective action signature;
      receive a second input command comprising selection of an icon, wherein the second input command comprises a number of selections of an icon;
      in response to receiving the second input command, play back the portion of the content corresponding to the action signature associated with the selected icon;
      retrieve a plurality of action signatures assigned to the subject of motion represented by the selected icon;
      retrieve, from the metadata, a start timestamp for each action signature of the plurality of action signatures; and
      identify, based on the start timestamp of each action signature, an action signature of the plurality of action signatures that precedes a current playback timestamp by the number of selections of the icon.

31. The system of claim 30, wherein the control circuitry configured to play back the portion of the content corresponding to the action signature associated with the selected icon is further configured to:
   retrieve, from the metadata, a start timestamp associated with the action signature; and
   play back the portion of the content beginning at the retrieved start timestamp.

32. The system of claim 30, wherein the control circuitry is further configured to:
   retrieve a captured image of each identified subject of motion;
   wherein the icon representing the respective subject of motion comprises the retrieved captured image.

33. The system of claim 30, wherein the control circuitry configured to identify an action signature is further configured to:
   identify a current playback timestamp of the content;
   identify a subject of motion displayed in the content at the current playback timestamp;
   retrieve, from a database, an identifier of a subject of motion having a timestamp that is within a threshold amount of time of the current playback timestamp, wherein the database associates a start timestamp and an end timestamp with motion of an identified subject of motion; and
   identify, as an action signature, the portion of the content between the start timestamp and the end timestamp.

34. The system of claim 33, wherein the control circuitry configured to identify a subject of motion displayed in the content at the current playback timestamp is further configured to:
   detect a face in a frame of the video of the content;
   compare a set of parameters corresponding to the respective detected face with corresponding parameters of identified subjects of motion;
   determine, based on the comparing, whether the respective detected face is an identified subject of motion; and
   in response to determining that the respective detected face is an identified subject of motion, retrieve the identifier of the subject of motion.

35. The system of claim 34, wherein the control circuitry configured to identify a subject of motion displayed in the content at the current playback timestamp is further configured to:
   detect an edge in a frame of the video of the content;
   compare a set of parameters corresponding to a respective detected edge with corresponding parameters of identified subjects of motion;
   determine, based on the comparing, whether the respective detected edge is an identified subject of motion; and
   in response to determining that the respective detected edge is an identified subject of motion, retrieve the identifier of the subject of motion.

36. The system of claim 30, wherein the metadata is received with the content.

37. The system of claim 30, wherein the control circuitry is further configured to:
   determine whether a temporal length of a motion associated with the action signature is below a minimum threshold amount of time;
   wherein, in response to determining that the temporal length of the motion is below the minimum threshold amount of time, playback of the content is performed in slow motion.

38. The system of claim 30, wherein the control circuitry is further configured to:
   determine whether a temporal length of a motion associated with the action signature is between a minimum threshold amount of time and a maximum threshold amount of time;
   wherein, in response to determining that the temporal length of the motion is between the minimum threshold amount of time and the maximum threshold amount of time, playback of the content is looped.

* * * * *

UNITED STATES PATENT AND TRADEMARK OFFICE
CERTIFICATE OF CORRECTION

PATENT NO. : 11,166,077 B2
APPLICATION NO. : 16/226916
DATED : November 2, 2021
INVENTOR(S) : Gabriel C. Dalbec et al.

Page 1 of 1

It is certified that error appears in the above-identified patent and that said Letters Patent is hereby corrected as shown below:

In the Claims

Claim 11, Column 17, Line 61, please change "signatures" to --signature--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*